United States Patent [19]

Sonoda et al.

[11] 4,441,184

[45] Apr. 3, 1984

[54] METHOD AND APPARATUS FOR TRANSMITTING A DIGITAL SIGNAL

[75] Inventors: Takenori Sonoda; Nobuhiko Watanabe; Masato Tanaka, all of Tokyo, Japan

[73] Assignee: Sony Corporation, Tokyo, Japan

[21] Appl. No.: 290,850

[22] Filed: Aug. 7, 1981

[30] Foreign Application Priority Data

Aug. 12, 1980 [JP] Japan ................................. 55-110674

[51] Int. Cl.³ ............................................. G06F 11/10
[52] U.S. Cl. ....................................... 371/40; 371/38
[58] Field of Search ....................... 371/37, 38, 39, 40; 360/38.1

[56] References Cited

U.S. PATENT DOCUMENTS

| 3,781,795 | 12/1973 | Zegers | 371/39 |
| 4,145,683 | 3/1979 | Brookhart | 340/146.1 F |
| 4,202,018 | 5/1980 | Stockham, Jr. | 360/47 |
| 4,211,997 | 7/1980 | Rudnick et al. | 371/38 |
| 4,238,852 | 12/1980 | Iga et al. | 371/40 |
| 4,306,305 | 12/1981 | Doi et al. | 371/40 |
| 4,356,564 | 10/1982 | Doi et al. | 371/40 |

FOREIGN PATENT DOCUMENTS 613320 10/1973 U.S.S.R. .

OTHER PUBLICATIONS

*IBM Technical Disclosure Bulletin*, C. H. Wolff, "Multiple Channel Correction of Burst Errors," vol. 7, No. 3, Aug. 1964, pp. 190-191.

*Primary Examiner*—Jerry Smith
*Assistant Examiner*—Gary V. Harkcom
*Attorney, Agent, or Firm*—Lewis H. Eslinger; Alvin Sinderbrand

[57] ABSTRACT

A PCM digital signal is provided with double-interleaving and error-correction encoding to protect against errors occurring during transmission, which can be carried out by magnetic recording and reproducing. The PCM signal is processed as error correcting blocks of several data word sequences and an associated error correction word sequence, and the double-interleaved sequences are then transmitted as transmission blocks. Up to one erroneous word in each error correction block can be corrected by using the error correction word sequence. Any uncorrectable word can be compensated by substituting a synthetic word interpolated from immediately preceding and following data words known to be correct. The distance between successive data words is made as great as possible so that a long burst error is unlikely to affect the ability to compensate uncorrectable errors. To achieve this, alternate words of the PCM signal are distributed to odd and even groups of sequences, and the interleaving is carried out by imparting different delay times to the respective sequences such that the greatest delay time imparted to the odd sequences is less than the shortest delay time imparted to the even sequences. The error correction word sequence is provided with a delay time intermediate the greatest delay time of the odd sequences and the shortest delay time of the even sequences.

8 Claims, 7 Drawing Figures

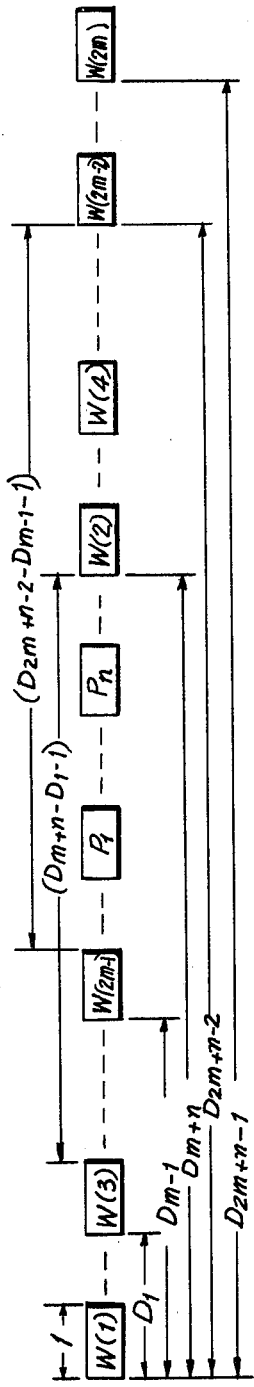

METHOD AND APPARATUS FOR TRANSMITTING A DIGITAL SIGNAL

BACKGROUND OF THE INVENTION

1. Field of the Invention:

This invention relates to system for encoding a digital signal for transmission, and is particularly directed to a system for protecting a digitized signal, such as digitized audio, from errors which may occur during transmission which can be carried out, for example, by magnetic recording and playback of a PCM audio signal, or by playback of an optical disc.

2. Description of the Prior Art:

In a conventional system for transmitting (or recording) an audio pulse-code-modulated (PCM) signal, an error correcting code is included with the information data. The error correcting code can be a parity code, b-adjacent code, Reed-Solomon code, or other code which will serve to enable correction of errors occurring in the received information data.

In such a system, transmission blocks can be formed of 2m words of the information data together with n error correction words, where m and n are each an integer. When n=1, up to one erroneous word in the block can be corrected, and if greater error protection is required, a larger value of n should be selected.

In the event that the digital signal is transmitted by recording it on tape and thereafter playing it back, dropout can occur causing so-called burst errors. If the block is, for example, formed of (2m+1) words, the occurrence of dropout having a length in excess of one word will cause at least two words in the block to be erroneous, and the erroneous words cannot be corrected.

In order to reduce the prospect that words having such uncorrectable error will occur, it has been proposed to use a word-unit interleaving, or error-spreading technique. In such a technique, upon transmitting (or recording) blocks of (2m+1) words, each of the words thereof is delayed by a different amount so that all of these words will be separated by one or more blocks on the carrier (or record medium). Then, upon receiving (or playing back) this interleaved signal, different respective delay times are provided for each of the 2m+1 words to cancel the delay provided prior to recording to provide error correcting blocks of 2m+1 words. This interleaving technique can be used to disperse, or spread burst errors over several error correcting blocks. If several blocks each have only one erroneous word, all the words can be corrected. In theory, an entire transmission block can be lost to drop out without degrading the error correcting power of this technique.

Unfortunately, upon occasion, errors will occur which cannot be completely corrected. If an uncorrectable error occurs, a masking technique is generally used to provide a synthetic data word to replace an uncorrectable erroneous word. An interpolation technique, which substitutes the average values of data words known to be correct, serves to make any erroneous words inconspicuous. Generally, where the data words represent successive samples of an audio signal, the two data words representing the samples immediately preceding and following the sample represented by an erroneous data word are used to generate an interpolated synthetic data word to mask the erroneous word.

However, when two or more words in succession are erroneous, this masking technique becomes quite difficult, and the uncorrectable erroneous words become more noticeable. In reproduced PCM audio such uncorrectable words are heard as noticeable "clicks."

It has also been previously proposed to design a digital signal transmission system using a plurality of parity or error correction words and doubly-interleaving the information words and parity words to provide additional protection against burst errors. This technique is explained in detail in our Application Ser. No. 218,256, filed Dec. 19, 1980, issued on Oct. 19, 1982 as U.S. Pat. No. 4,355,392.

Nevertheless, despite the success of the foregoing technique, the transmitted signal is still vulnerable to burst errors affecting a number of transmission blocks, so that two successive words in the decoded signal could both contain uncorrectable errors preventing adequate error masking.

OBJECTS AND SUMMARY OF THE INVENTION

Accordingly, it is an object of this invention to provide an improved digital signal transmission system which avoids the drawbacks of the prior art.

It is another object of this invention to provide a digital signal transmission system which achieves optimum error compensation.

It is a further object of this invention to provide a novel digital signal transmission system in which a parity code, or other error correcting code is interleaved to enable erroneous data words to be corrected, and in which the data words thereof are interleaved so as to achieve a maximum separation of adjacent words in the transmitted signal, so that any data words containing uncorrectable errors can be compensated, or masked.

According to an aspect of this invention, a method of processing a digital signal for transmission is provided and comprises the following steps: The digital signal is received as a series of successive data words and the series of data words is distributed into a first group of word sequences and a second group of word sequences, so that every other data word is distributed to the sequences of the first group while the alternate data words are distributed to the sequences of the second group. Then, at least one sequence of error correction words, such as parity words, is formed based on respective data words of the sequences of data words. One or more interleaving stage imparts different respective delays to the sequences of data words and to the one or more sequence of error correction words so that the shortest delay time for any word sequence in the second group is longer than the greatest delay time for any word sequence in the first group, and so that the one or more error correction word sequence has a delay time that is intermediate the greatest delay time of the first group and the shortest delay time of the second group. Thereafter, transmission blocks are formed of the words of the respective data word sequences and the error correction word sequence. A synchronizing word and a CRC check word can be added to each block.

A decoder operates in a manner generally complementary to the above method, and restores the digital signal to its original form while correcting any words having correctable errors and compensating any words having uncorrectable errors. In the decoder, a distributor separates the words of each received transmission block into the first and second groups of data word sequences and at least one error correction word sequence. Then, a deinterleaver stage imparts respective complementary delays to the data word and error correction word sequences to compensate for the delays imparted thereto prior to transmission. An error correction decoder generates a syndrome from respective words of the data word sequences and the error correction word sequence, and corrects any correctable erroneous words. Any erroneous words have been given an error pointer bit previously, and this pointer bit is cleared when the erroneous word is corrected. However, the pointer bit remains for any words with uncorrectable error. Thereafter, in an interpolation stage or other error masking stage, any identified uncorrectable erroneous word in one of the first and second groups is compensated by substituting therefor a synthetic data word formed of one or more words from the other group. An assembly circuit assembles the words of the first group alternately with the words of the second group to form the corrected, restored digital signal.

The above and other objects, features, and advantages of this invention will become apparent from the ensuing description of a preferred embodiment thereof, when read in conjunction with the accompanying drawings.

BRIEF DESCRIPTION OF THE DRAWINGS

FIG. 2 is a schematic view used for explaining the interleaving process according to this invention;

FIG. 3 is a block diagram of an error-correcting encoding system according to this invention;

FIG. 4 is a block diagram of an error-correction decoding system according to this invention, and which is complementary to the system of FIG. 3;

FIG. 5 is a schematic view showing a signal transmission block used in transmitting a digital signal; and FIGS. 6A and 6B are schematic views used for explaining the advantages of this invention.

DETAILED DESCRIPTION OF A PREFERRED EMBODIMENT

Figure 1:
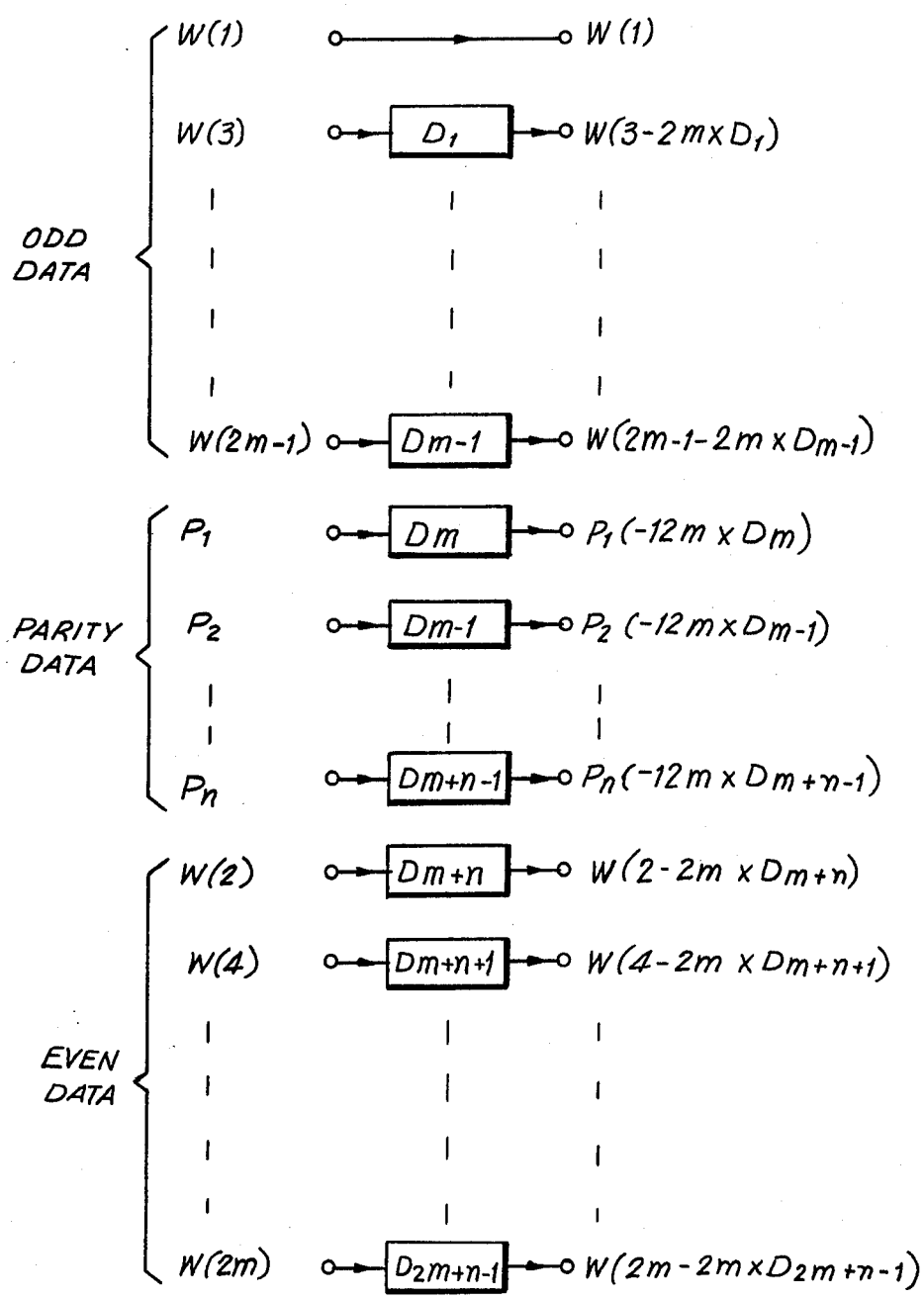
FIG. 1 is a schematic block diagram showing an interleaving circuit for use in this invention.

With reference to the drawings, FIG. 1 illustrates an interleaving scheme according to the present invention. In one example, this invention is applied to the recording and playback of a pulse code modulated (PCM) audio signal of one channel. In such example, the PCM audio signal includes a PCM data sequence (Wi) consisting of a succession of data words W1, W2, W3, . . . , each of which represents a successive sampled analog value of the audio signal. Also in this example, an even number 2m of these data words are grouped together to form a block [B] to be used in the further processing according to this invention. In other words, the PCM data words forming any given block can be represented as the following data block:

[B] = [W(1), W(2), W(3) . . . , W(2m)]

A number n of error correcting words P1, P2, . . . , Pn, which can be, for example, parity code words, are also provided. These error correcting words form an error-correcting word block, or parity data block

[P] = [P1, P2, . . . , Pn].

The data block [B] and the parity block [P] are combined to form one error-correcting code block of (2m+n) words.

The interleaving arrangement of FIG. 1 is formed so that the (2m+n) words of the combined PCM data words and parity words of each block are delayed by respective different delay amounts of 0, $D_1, D_2, \ldots$, and $D_{2m+n-1}$. These delay amounts are integral numbers of word lengths, having a relation $$0 < D_1 < D_2 < D_3 \ldots < D_{2m+n-1}.$$

As further shown in the interleaving scheme of FIG. 1, each PCM data block [B] is divided into an odd data block [$B^o$] and an even data block [$B^e$]. In other words, the words of the PCM data sequence [Wi] are alternately distributed to the data word sequences forming the odd data blocks [$B^o$] and the even data blocks [$B^e$] as follows:

[$B^o$] = [W(1), W(3), . . . , W(2m−1)]

[$B^e$] = [W(2), W(4), . . . , W(2m)]

The PCM data sequences W(1), W(3), . . . of the group forming the odd data blocks [$B^o$] are alloted with relatively smaller delay amounts $0, D_1, D_2, \ldots, D_{m-1}$, while the word sequences W(2), W(4), . . . of the group forming the even data blocks [$B^e$] are provided with relatively larger delay amounts $D_{m+n}, D_{m+n+1}, \ldots, D_{2m+n-1}$. At the same time, the group of parity word sequences P1, P2, . . . Pn are provided with respective intermediate delay times $D_m, D_{m+1}, \ldots, D_{m+n-1}$. Thus, the delays imparted to the PCM data word sequences W(1), W(2), . . . W(2m) and the parity word sequences P1, P2, . . . Pn are such that the shortest delay time for any word sequence in the group of even words W(2), W(4), . . . W(2m) is longer than the greatest delay time for any of the data word sequences in the group of odd data word sequences W(1), W(3), . . . W(2m−1), and so that the parity word sequences P1, P2, . . . Pn have respective different delay times that are intermediate the greatest delay time of the odd group and the shortest delay time of the even group.

The above-described distribution of delay times for the respective word sequences, which occurs in the interleaving arrangement of FIG. 1, ensures that the difference in respective delay times between any two successive PCM data words Wi and Wi+1 will be as great as possible. In other words, in the interleaved data, the data sequences W(i) and W(i+1) which respectively include adjacent words from the input PCM data sequence [Wi] will have as great a difference in delay time as possible.

Following the interleaving carried out in the arrangement of FIG. 1, transmission blocks are formed of the words of the respective data word sequences and parity word sequences W(1), W(3−2mD$_1$), . . . , W(2m−1−2mD$_{m-1}$), P$_1$(−12mD$_m$), P$_2$(−12mD$_{m-1}$), . . . , P$_n$(−12mD$_{m+n-1}$), W(2−2mD$_{m+n}$), W(4−2mD$_{m+n+1}$), . . . , W(2m−2mD$_{2m+n-1}$).

Thereafter, the transmission blocks are converted to serial form, and are transmitted, for example, by recording the same on a magnetic medium.

FIG. 2 illustrates the manner in which successive words W(1), W(2), . . . W(2m) are separated from one another so as to minimize the vulnerability of the digital signal to burst errors. As illustrated therein, successive alternate words, e.g., W(1) and W(3) are separated from one another by a distance corresponding to ($D_1−1$) transmission blocks. However, timewise successive data words W(1) and W(2), or W(2) and W(3) are separated from one another by greater distances corresponding to ($D_{2m+n-2}-1$) and ($D_{m+n}-D_1-1$) transmission blocks, respectively. This feature enhances the ability to compensate for uncorrectable errors where the transmitted, or recorded signal is affected by long burst errors. The reason for this can be explained as follows:

If, for example, the PCM data word W2 included in the PCM data sequence W(2) contains an uncorrectable error, a synthetic data word $\hat{W}2$ is substituted therefor by interpolation, that is, by using the average value of interpolation, that is, the word $\hat{W}2$ is formed by averaging the values of the correct PCM data words W1 and W3 adjacent to the erroneous word W2.

However, in order to make this interpolation possible, it is required that the maximum error burst length not exceed the shorter of the distance between the word positions of the sequences W(2) and W(1) and the distance ($D_{m+n}-D_1-1$) transmission blocks between the word positions of the sequences W(2) and W(3). As the latter distance is the longer of the two, the maximum burst error length b which is compensatable according to this invention can be expressed as follows:

$$b = \text{MIN} \; [(D_{m+n}-D_1-1), (D_{m+n+1}-D_2-1), \ldots , (D_{2m+n-2}-D_{m-1}-1)]$$

where MIN is a minimum value operator, and b is expressed in terms of transmission block lengths.

Further, if respective delay amounts $D_i$ for the successive word sequences in each of the odd and even groups have a constant difference of D words therebetween, and any particular delay time $D_i$ equals the product of the integers i and D times one block length, the maximum compensatable burst error length b' can be expressed as follows:

$$b' = (m+n-1)D-1.$$

Thus, it should be recognized that if the digital signal is encoded according to this invention, as described above, the compensatable burst error length b' will be as large as possible.

A practical embodiment of this invention will now be described with reference to FIG. 3 and FIG. 4, which show an error-correcting encoding arrangement and an error-correcting decoding arrangement complementary thereto, respectively, which are suitable for use in recording an audio PCM signal on magnetic tape, and in playing back the so-recorded audio PCM signal.

In FIG. 3, a serial audio PCM signal is supplied through an input terminal 1 to an odd-even separating circuit 2, where the audio PCM signal is distributed into a plurality of odd data sequences W(1), W(3), and W(5) and a plurality of even data sequences W(2), W(4), and W(6). That is, in this embodiment, the parameter m of FIG. 1 is selected as m=3.

These data sequences are respectively composed of input PCM data words as follows:

| |
|---|
| W(1) = W1, W7, W13, W19 ... |
| W(2) = W2, W8, W14, W20 ... |
| . |
| . |
| . |
| W(6) = W6, W12, W18, W24 ... |

These six data sequences are supplied, one word at a time, to a modulo-two adder 3 to form a first parity data sequence P(1). This first parity data sequence is composed of parity words P1, P7, P13 .... These seven data sequences are supplied to a first interleaving stage 4.

The interleaving stage 4 is formed of respective delay circuits, which can, for example, each include a random access memory, to impart respective delay times of zero words, d words, 2d words, 3d words, 5d words, 6d words, and 7d words to the respective sequences W(1), W(3), W(5), P(1), W(2), W(4), and W(6). Following the first interleaving stage 4, the six PCM data sequences W(1) to W(6) are applied, one word at a time, to a second modulo-two adder 5 to form a second parity data sequence Q(1). The latter parity data sequence is composed of parity words Q1, Q7, Q13, ....

Thereafter, the six PCM data sequences W(1) to W(6) the first parity data sequence P(1), and the second parity data sequence Q(1) are supplied to a second interleaving stage 6.

The second interleaving stage 6 includes delay circuits imparting respective delay amounts of zero, (D-d) words 2(D-d) words, 3(D-d) words, 4(D-d) words, 5(D-d) words, 6(D-d) words, and 7(D-d) words to the respective data sequences W(1), W(3), W(5), P(1), Q(1), W(2), W(4), and W(6). Then, the second interleaving stage 6 provides at its output interleaved data sequences which correspond to the above sequences, but which are identified in the drawing with a prime attached thereto. The resulting interleaved data and parity word sequences W(1)', W(3)', W(5)', P(1)', Q(1)', W(2)', W(4)', and W(6)' are applied to an assembling circuit 7 which provides, at an output 8 thereof, a stream of transmission blocks each having a serialized group of eight words respectively derived from these interleaved sequences. An example of a transmission block is shown illustratively in FIG. 5. Although not essential for this invention, it is preferred to add a synchronizing code word SYNC at the beginning of each transmission block and to add a check code word CRC to the end thereof. Synchronizing signal mixing circuits and CRC code generators are conventional, and thus are not described herein.

The transmission blocks provided from the output terminal 8 can then be supplied to a modulator and recording amplifier, and can thereafter be recorded by one or more fixed heads onto a magnetic tape.

The digital signal thus recorded can then be picked up from the magnetic tape by an analogous one or more stationary heads, and supplied through a reproducing amplifier, a demodulator, and a CRC check circuit (which are not shown) to the decoding circuit as illustrated in FIG. 4. As a result of the error detection in the CRC check circuit, a pointer bit is added for each word determined to be erroneous.

The transmission blocks of FIG. 5 are presented in serial form to an input terminal 9 and thence to a distributing circuit 10, which converts the digital signal into the six PCM data sequences and the two parity sequences W(1)', W(3)', W(5)', P(1)', Q(1)', W(2)', W(4)', and W(6)'. These sequences are then provided to a first deinterleaving stage 11.

The deinterleaving stage 11 corresponds to the second interleaving stage 6 of FIG. 3, and provides reciprocal amounts of delay of 7(D-d) words to zero words for the respective word sequences W(1)', W(3)', W(5)', P(1)', Q(1)', W(2)', W(4)', W(6)'.

The deinterleaved PCM data word sequences and parity word sequences are then applied to a Q decoder 12 where error correction is carried out by using the second parity word sequence Q(1).

In the Q decoder 12, the six PCM data word sequences W(1) to W(6) and the second parity data sequence Q(1) are applied to a modulo-two adder to form an error syndrome. The error syndrome is used to correct any one erroneous word. Also, in the Q decoder 12, any error pointer bit associated with an erroneous word is cleared if that word is corrected.

The PCM data word sequences W(1) to W(6) and the parity word sequence P(1) are thereafter supplied from the Q decoder 12 to a second deinterleaving stage 13. This deinterleaving stage 13 is complementary to the first interleaving stage 4 of FIG. 3, and serves to compensate for the delay amounts imparted thereby. Accordingly, delays of 7d words to 4d words are imparted to the sequences W(1), W(3), W(5), P(1), while delay amounts of 2d, d, and 0 words are imparted to the sequences W(2), W(4), and W(6). Consequently, the second deinterleaving stage 13 returns the PCM data back to its original order prior to its encoding in the circuit of FIG. 3.

Thereafter, the PCM data word sequences W(1) to W(6) and the parity word sequence P(1) are applied to a P decoder 14 to correct up to one erroneous word therein. The construction of the P decoder 14 is similar to that of the Q decoder 12. The P decoder 14 also clears any pointer bit associated with an erroneous word if the error contained therein is cleared.

In this embodiment of the invention, a double-interleave operation is carried out so that each word of the PCM data has two error correcting, or parity words associated therewith, and, likewise, any two parity words will have at most a single PCM data word in common among their respective generating elements. As a result, if an erroneous word cannot be corrected by one parity word, the other parity word will usually serve to correct the error therein. Consequently, the error correctability of the double-interleave technique is considerable improved as compared with a corresponding single parity-word technique.

The six PCM data word sequences W(1) to W(6) are supplied from the P decoder 14 to a compensating circuit 15, which serves to compensate, or mask any word containing an uncorrectable error, as indicated by the presence of a pointer bit.

In this embodiment, the compensating circuit 15 compensates for such erroneous words by providing a synthetic, interpolated word corresponding to the average value of adjacent words immediately before and behind the erroneous word.

The output of the compensating circuit 15 is then applied to an odd-even assembling circuit 16 which converts the six PCM data sequences W(1) to W(6) to serial form, and provides at a output terminal 17 thereof a single serial PCM data sequence.

A PCM demodulator (not shown) can be used to convert the PCM data into a high-quality analog audio signal.

In the foregoing embodiment of this invention, the data are transmitted as encoded transmission blocks including, for example, six words of the sequences W(1)' to W(6)' and two words of the sequences P(1)' and Q(1)'. The words of the sequences W(1)' to W(6)' represent values of an analog signal sampled at spaced-apart times. Consequently, successive PCM data words, for example W1 to W6 and associated parity words $P_1$ and $Q_1$ are separated on a track of the magnetic tape generally as shown in FIG. 6A. That is, the distances between space-wise successive words W1 and W3, between words W3 and W5, between words W2 and W4, and between words W4 and W6 are all D block lengths, while the difference between the words W5 and W2 equals 3D block lengths. However, the distance between the time-wise successive words W3 and W2 equals (4D−1) block lengths. This distance represents the maximum compensatable burst error length, that is, the maximum length that a burst error can occupy without affecting two words W2 and W3 representing successive time-wise samplings of an analog signal.

Thus, the embodiment of FIGS. 3 and 4 achieves a maximum compensatable burst error length b' corresponding to (m+n−1)D−1 block lengths, as mentioned above in respect to FIG. 1.

By way of contrast, if the odd and even separating circuit 2 is not used, and the word sequences W(1) to W(6) are merely interleaved in their original order, the PCM words as recorded on magnetic tape are distributed in the fashion as shown in FIG. 6B. In such a scheme, the maximum compensatable burst length b is only D−1 block lengths. Thus, if the present invention is employed, the maximum compensatable burst length can be extended by a factor of approximately (m+n−1). In other words, when the present invention is employed, the error compensating ability is about (m+n−1) times as powerful as the error compensating ability when the present invention is not employed. Moreover, the enhanced error correcting power of the double-interleaved technique is not in any way impaired by adapting the same in accordance with the present invention.

As mentioned above, the present invention can be employed, not only when recording a PCM audio signal, but also when transmitting a digital PCM signal over a cable of an RF carrier.

Further, instead of the parity codes P(1) and Q(1) used in the foregoing embodiment, a b-adjacent code or other error correcting code can be used.

In addition, this invention may be practiced when only a single interleave technique, rather than the described double-interleave technique, is employed.

One advantageous application of this invention is splice editing of a PCM-recorded tape. In particular, in a fixed-head type PCM tape system, if splice editing is used, many errors are generated near the splice, or edit point. In order to prevent the splice from generating undesirable clicks in the demodulated signal, a single channel PCM data sequence is divided into an odd data sequence and an even data sequence, and separate error correction encoding is provided with respect to each of these data sequences. One of the data sequences is then delayed a predetermined time with respect to the other sequence. In such a case, a b-adjacent relation occurs in the respective odd and even data sequences. For example, in the odd data sequence, the words W1 and W3, W3 and W5, W5 and W7, are regarded as b-adjacent pairs of words. Consequently, the distance between the words of each such pair of words should be made as great as possible. Therefore, a technique according to this invention is applied to each of the data sequences.

Having described a specific preferred embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

We claim:

1. An encoder for preparing a digital signal for transmission so as to protect against errors occurring as a result of transmission, comprising:

means for receiving said digital signal as a series of successive data words;

separating circuit means for alternately distributing said data words of said series into a first group of sequences of data words and a second group of sequences of data words;

encoder circuit means for providing at least one error correction word sequence, generating elements of which are formed of respective words of said sequence of data words;

interleaving means imparting different respective delays to said sequences of data words so that the shortest delay time for any word sequence in the second group is longer than the greatest delay time for any word sequence in the first group, and also imparting to said at least one error correction word sequence a delay that is intermediate said greatest delay time of the first group and said shortest delay time of the second group; and assembly circuit means for forming a series of transmission blocks of the words of the respective data word sequences and said at least one error correction word sequence delayed by their respective delay times.

2. An encoder according to claim 1, wherein said encoder circuit means includes delay means for imparting, to said data word sequences and to said error correction word sequence, delays which are respective different integral multiples of a number D of word lengths.

3. An encoder according to claim 1, wherein said interleaving means includes a first interleaving stage providing respective different proportional fractions of said delays to said data word sequences and said error correction word sequence; a second encoder circuit for providing a second error correction word sequence, generating elements of which are formed of respective words of said sequences of data words; and a second interleaving stage providing respective different proportional fractions of said delays to said data word sequences, said first-mentioned error correction word sequence, and said second error correction word sequence.

4. A decoder for processing a received digital signal in the form of a series of transmission blocks of words, said blocks being formed by alternately distributing data words of a series of successive data words into two groups of sequences of respective data words, forming at least one error correction word sequence in response to said sequences of data words providing said words with respective different delays such that the shortest delay time for any data word sequence in one of said groups is longer than the greatest delay time for any data word sequence in the other group, providing said at least one error correction word sequence with a delay time intermediate said shortest and said greatest delay times, and forming said series of transmission blocks of the words of the respective data words sequences and said at least one error correction word sequence delayed by their respective delay times, said decoder comprising:

distributing means for distributing the words of each block to first and second groups of respective data word sequences and to an error correction word sequence;

deinterleaving means for imparting respective complementary delay times to said data word and error correction word sequences to compensate for delays imparted thereto prior to transmission;

decoder means following said deinterleaving means for generating a syndrome from respective words of said data word sequences and said error correction word sequence and correcting any correctable erroneous words in said data word sequences;

means for identifying any uncorrectable erroneous words in said data word sequences;

means for masking any identified uncorrectable erroneous words in one said group by substituting a data word formed from one or more words from the other group; and assembling circuit means for assembling the words of said first group and said second group alternately to form a corrected restored digital signal.

5. A method of processing a digital signal for transmission comprising the steps of:

receiving said digital signal as a series of successive data words;

alternately distributing said data words of said series into a first group of sequences of data words and a second group of sequences of data words;

forming at least one error correction word sequence having as generating elements thereof said sequences of data words;

imparting different respective delay times to said sequences of data words so that the shortest delay time for any word sequence in the second group is longer than the greatest delay time for any word sequence in the first group;

imparting to each said at least one error correction word sequence a delay time that is intermediate said greatest delay time of the first group and said shortest delay time of the second group; and forming a series of transmission blocks of the words of the respective data word sequences and said at least one error correction word sequence delayed by their respective delay times.

6. A method of processing a digital signal according to claim 5, wherein said steps of imparting delay times to said sequences of data words and to said at least one error correction word sequence includes imparting respective total delays equal to different respective integral multiples of a number D of word lengths, said first and second groups each comprise m sequences, and n error correction word sequences are provided, where m, n and D are positive, non-zero integers, so that adjacent words of said serial data are spaced no closer in the series of transmission blocks than $(m+n-1)D-1$ blocks.

7. A method of processing a digital signal according to claim 1, wherein said step of imparting delay times to said sequences of data words includes imparting, in a first interleaving stage, different proportional fractions of said delay times to the respective data word sequences, and providing the remainder of said delay times in one or more successive interleaving stages.

8. A method of processing a digital signal according to claim 3, wherein said step of forming at least one error correction word sequence includes forming a first error correction word sequence prior to said first interleaving stage, generating elements of which are formed of the words of said sequences of data words, and forming at least one respective successive error correction word sequence prior to each successive interleaving stage, generating elements of which are formed of the words of said sequences of data words.

* * * * *